(12) United States Patent
Shimada et al.

(10) Patent No.: US 11,462,087 B2
(45) Date of Patent: Oct. 4, 2022

(54) SURVEILLANCE CAMERA AND INFORMATION PROCESSING APPARATUS

(71) Applicant: PANASONIC i-PRO SENSING SOLUTIONS CO., LTD., Fukuoka (JP)

(72) Inventors: Takeshi Shimada, Fukuoka (JP); Junko Nakano, Fukuoka (JP); Takamitsu Arai, Fukuoka (JP); Shuuji Kawazoe, Fukuoka (JP); Toshihiko Yamahata, Fukuoka (JP)

(73) Assignee: Panasonic i-PRO Sensing Solutions Co., Ltd., Fukuoka (JP)

( * ) Notice: Subject to any disclaimer, the term of this patent is extended or adjusted under 35 U.S.C. 154(b) by 43 days.

(21) Appl. No.: 16/928,648

(22) Filed: Jul. 14, 2020

(65) Prior Publication Data

US 2021/0020005 A1 Jan. 21, 2021

(30) Foreign Application Priority Data

Jul. 16, 2019 (JP) .............................. JP2019-131160

(51) Int. Cl.
*G08B 13/196* (2006.01)
*G06T 7/73* (2017.01)
*G06V 20/40* (2022.01)
*G06V 20/52* (2022.01)

(52) U.S. Cl.
CPC .......... *G08B 13/19608* (2013.01); *G06T 7/74* (2017.01); *G06V 20/40* (2022.01); *G06V 20/52* (2022.01); *G08B 13/1963* (2013.01); *G06T 2207/30232* (2013.01)

(58) Field of Classification Search
CPC .......... G08B 13/19608; G08B 13/1963; G06K 9/00711; G06K 9/00771; G06K 9/627; G06K 2009/3291; G06K 2209/21; G06T 7/74; G06T 2207/30232; G06V 20/40; G06V 20/52; G06V 10/82; G06V 10/62; G06V 2201/07
See application file for complete search history.

(56) References Cited

U.S. PATENT DOCUMENTS

| | | | |
|---|---|---|---|
| 10,764,588 B2* | 9/2020 | Fu | G06N 3/08 |
| 2003/0138133 A1* | 7/2003 | Nagaoka | G06V 20/58 |
| | | | 382/104 |
| 2009/0316955 A1* | 12/2009 | Takeuchi | G08B 13/19671 |
| | | | 382/103 |
| 2010/0177234 A1* | 7/2010 | Ogura | G06T 7/194 |
| | | | 348/333.03 |
| 2015/0179219 A1* | 6/2015 | Gao | G06T 7/254 |
| | | | 386/278 |
| 2018/0033023 A1* | 2/2018 | Pereira | G06Q 30/0201 |

(Continued)

FOREIGN PATENT DOCUMENTS

JP 2017-195617 A 10/2017

*Primary Examiner* — Amara Abdi
(74) *Attorney, Agent, or Firm* — Seed IP Law Group LLP

(57) ABSTRACT

A surveillance camera includes an imaging unit configured to output a video frame, and a control unit configured to set a search range in the video frame and to extract a tracking-target image by using a feature quantity of an image in the search range. In a case where an object image other than the tracking target is contained in the search range, the control unit masks a feature quantity of the object image and extracts the tracking-target image.

9 Claims, 14 Drawing Sheets

(56) References Cited

U.S. PATENT DOCUMENTS

| | | | |
|---|---|---|---|
| 2019/0033867 A1* | 1/2019 | Sharma | G01C 21/28 |
| 2019/0130582 A1* | 5/2019 | Cheng | G06V 20/52 |
| 2020/0285904 A1* | 9/2020 | Gavrilovic | G06K 9/6273 |
| 2021/0150251 A1* | 5/2021 | Chen | H04N 5/23219 |

* cited by examiner

TIME t

TIME t + 1

| BASIC | TRACKING EXCLUSION MASKING SETTING | | |
|---|---|---|---|
| TRACKING EXCLUSION MASKING AREA | | | |
| SETTING | ● USE | | ○ NOT USE |
| AUTOMATIC CHANGE AT THE TIME OF SHIFT OF ANGLE OF VIEW | ● CHANGE | | ○ NOT CHANGE |
| UPDATE AREA REGULARLY | Off ▽ | | |
| MANUAL SETTING | DETAILED SETTING >> | | |
| MASKING AREA CHANGE ALARM | ● USE | | ○ NOT USE |

A1

| |
|---|
| off |
| 5 minutes |
| 15 minutes |
| 30 minutes |
| 1 hour |
| 12 hour |
| 24 hour |
| 1 month |
| 3 month |

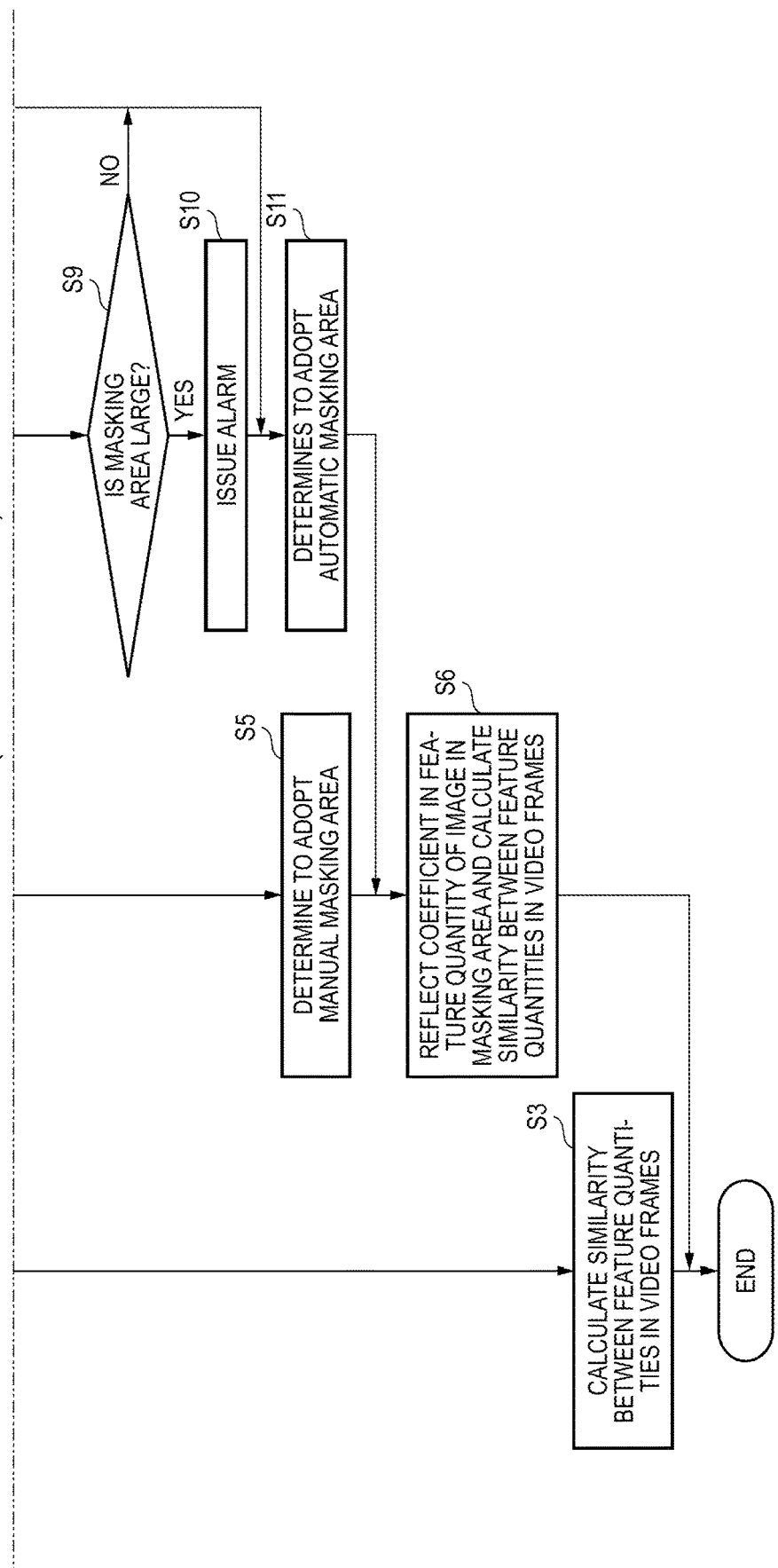

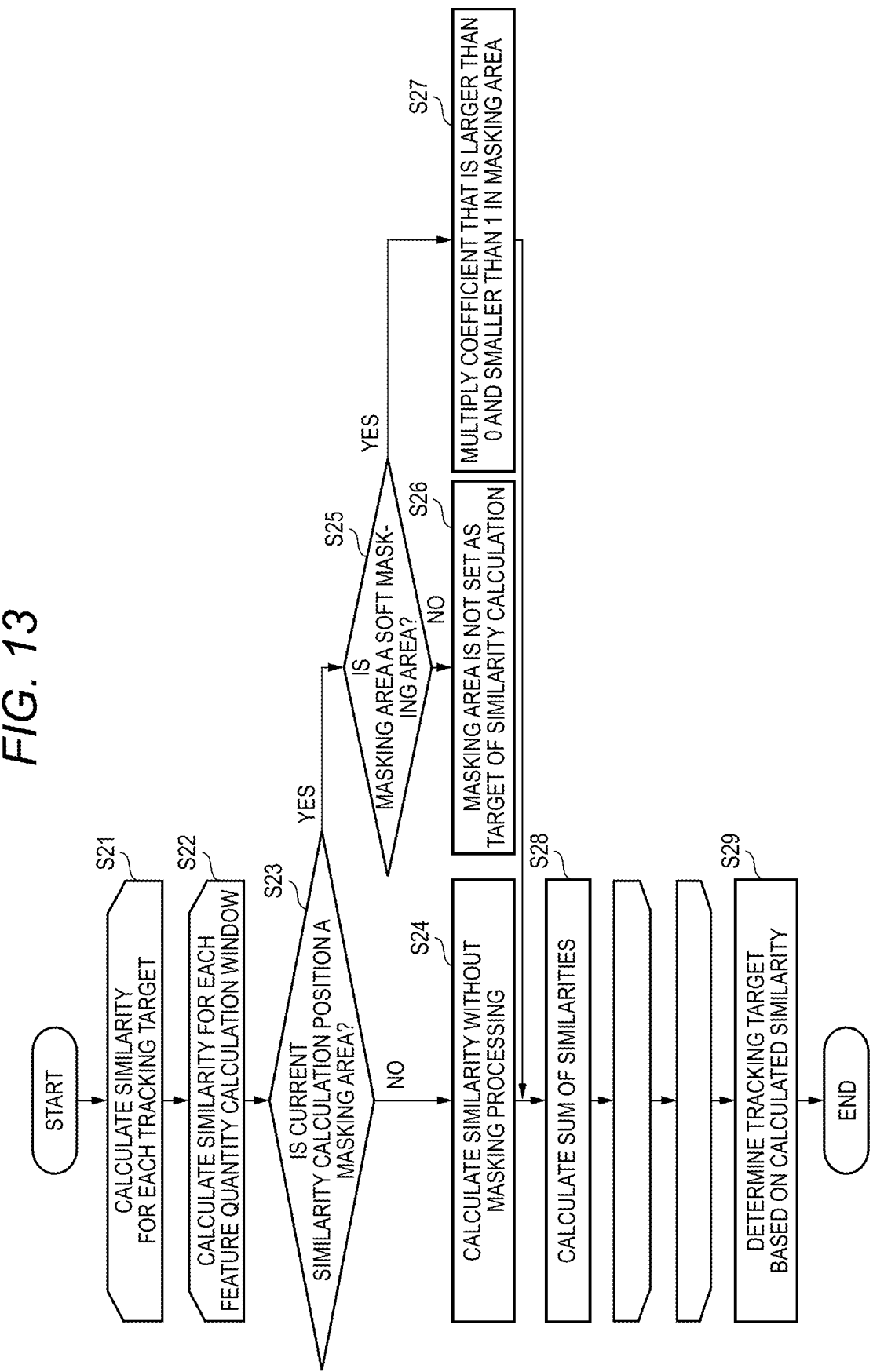

SURVEILLANCE CAMERA AND INFORMATION PROCESSING APPARATUS

TECHNICAL FIELD

The present disclosure relates to a surveillance camera and an information processing apparatus.

BACKGROUND ART

Patent Literature 1 discloses a camera that enhances tracking performances for movement of a subject.

CITATION LIST

Patent Literature

Patent Literature 1: JP-A-2017-195617

SUMMARY OF INVENTION

In order to track (extract) images of a tracking target to be moved in a series of video frames, a surveillance camera sets a search range for searching for a tracking target in a video frame. When an object other than the tracking target is displayed in the search range of the video frame, the surveillance camera may change the tracking target to the object other than the tracking target. For example, when a traffic light other than a tracking target overlaps a vehicle, which is a tracking target, and is displayed in a search range of a video frame, the surveillance camera may change the tracking target from the vehicle to the traffic light.

The non-limiting embodiment of the present disclosure provides a surveillance camera and an information processing apparatus that appropriately track a tracking target.

A surveillance camera according to an aspect of the present disclosure includes: an imaging unit that outputs a video frame; and a control unit that sets a search range in the video frame and extracts a tracking-target image by using a feature quantity of an image in the search range. In a case where an image of an object other than the tracking target is contained in the search range, the control unit masks a feature quantity of the image of the object and extracts the tracking-target image.

An information processing apparatus according to another aspect of the present disclosure includes: a reception unit that receives a video frame from a surveillance camera; and a control unit that sets a search range in the video frame and extracts a tracking-target image by using a feature quantity of an image in the search range. In a case where an image of an object other than the tracking target is contained in the search range, the control unit masks a feature quantity of the image of the object and extracts the tracking-target image.

It should be noted that these comprehensive or specific aspects may be implemented by a system, a device, a method, an integrated circuitry, a computer program, or a recording medium, or may be implemented by any combination of the system, the device, the method, the integrated circuitry, the computer program, and the recording medium.

According to an embodiment of the present disclosure, it is possible to appropriately track a tracking target.

Further, advantages and effects of an embodiment of the present disclosure will become apparent from the specification and drawings. These advantages and/or effects are provided by features described in several embodiments and the specification and drawings, and it is not necessary to provide all the features in the embodiments and the specification and drawings to obtain one or more identical features.

BRIEF DESCRIPTION OF DRAWINGS

FIG. 13 is a flowchart showing an example of detailed operation of S6 in FIG. 12.

DESCRIPTION OF EMBODIMENTS

Hereinafter, an embodiment of the present invention will be described in detail with reference to the drawings as appropriate. However, unnecessarily detailed descriptions may be omitted. For example, a detailed description of a well-known matter or a repeated description of substantially the same configuration may be omitted. This is to avoid unnecessary redundancy in the following description and to facilitate understanding of those skilled in the art.

It should be noted that the accompanying drawings and the following description are provided for a thorough understanding of the present disclosure by those skilled in the art, and are not intended to limit the subject matter recited in the claims.

Figure 1:
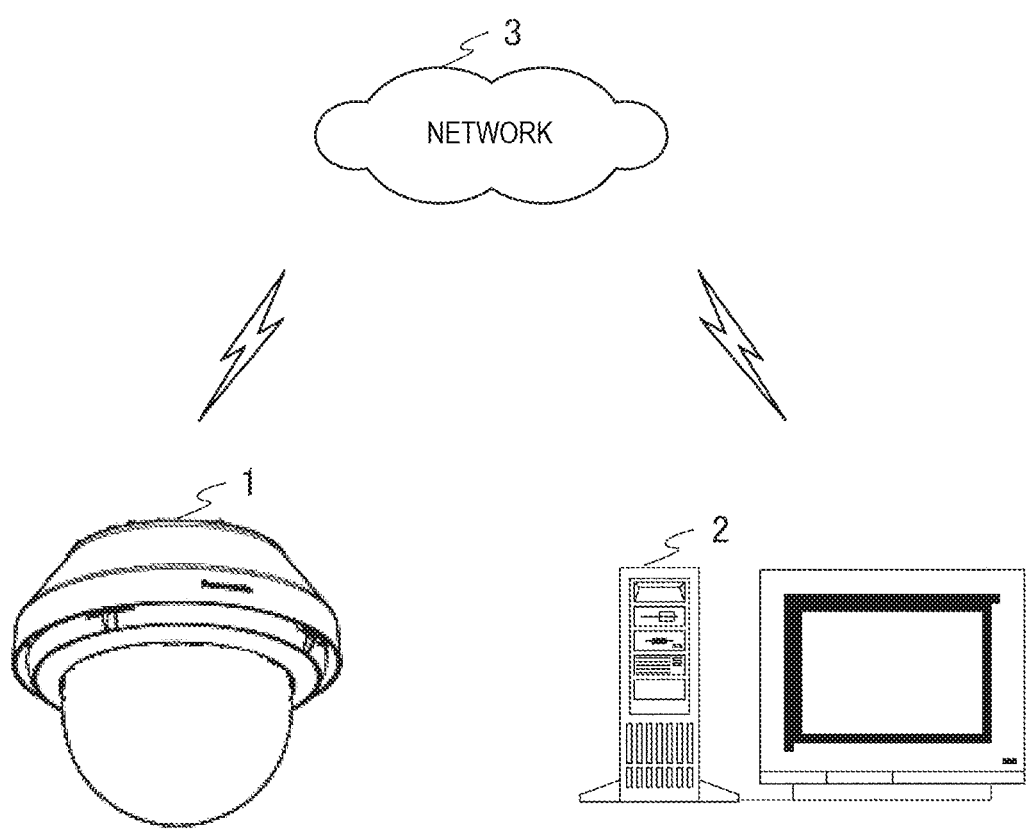
FIG. 1 shows an example of a configuration of a surveillance camera system according to an embodiment.

FIG. 1 shows an example of a configuration of a surveillance camera system according to an embodiment. As shown in FIG. 1, the surveillance camera system includes a surveillance camera 1 and an information processing apparatus 2. The surveillance camera 1 and the information processing apparatus 2 communicate with each other via a network 3 including a wireless network, such as a mobile phone, the internet, or the like.

The surveillance camera 1 is installed, for example, on a traffic light pole, which is installed at the intersection, or a telephone pole, or is installed outside or inside a construction such as a building. The surveillance camera 1 may be, for example, a pan-tilt-zoom (PTZ) camera.

The surveillance camera 1 has a function of tracking a moving object on a captured video. For example, the surveillance camera 1 tracks a vehicle such as an automobile, a bike, and a bicycle, a person, or the like on a video. Hereinafter, an object to be tracked by the surveillance camera 1 may be referred to as a tracking target.

The information processing apparatus 2 is a device that sets the surveillance camera 1. The information processing apparatus 2 is, for example, a personal computer or a server. The information processing apparatus 2 may, for example, instruct the surveillance camera 1 about the type of the tracking target according to an instruction from the user. For example, the information processing apparatus 2 may instruct the surveillance camera 1 about an automobile, a bike, a bicycle, a person, or the like as a target to be tracked. There may be a plurality of types of tracking targets to be instructed.

The information processing apparatus 2 may be a device that monitors a video of the surveillance camera 1. The surveillance camera 1 may transmit the captured video to the information processing apparatus 2 via the network 3.

Figure 2A:
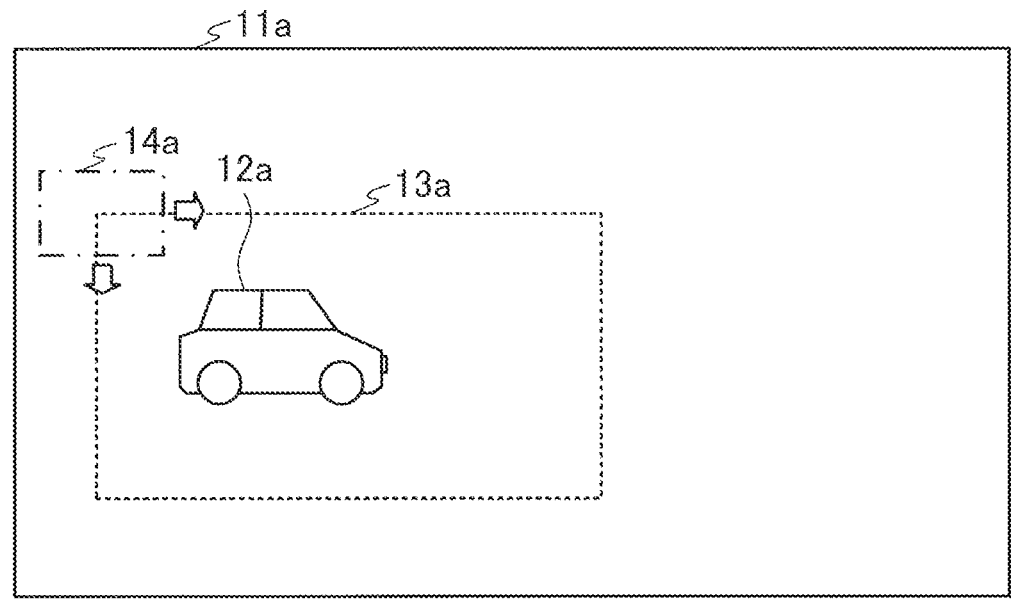
FIG. 2A shows an example of tracking processing of a surveillance camera.
Figure 2B:
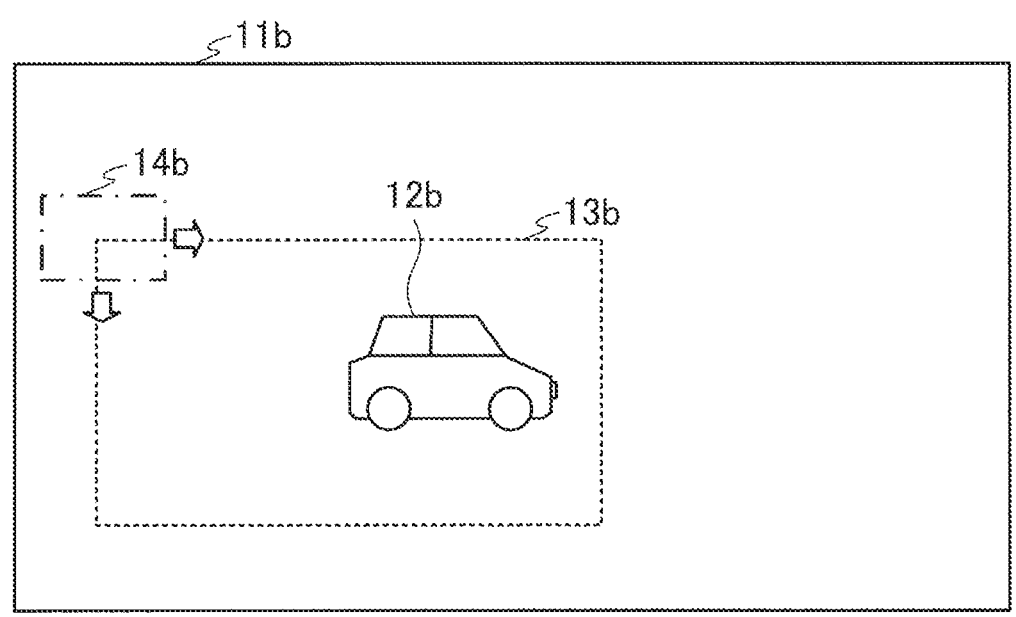
FIG. 2B shows an example of tracking processing of the surveillance camera.

FIGS. 2A and 2B show examples of tracking processing of the surveillance camera 1. FIG. 2A shows a video frame 11a of the surveillance camera 1, and an image 12a. FIG. 2B shows a video frame 11b of the surveillance camera 1, and an image 12b. FIGS. 2A and 2B show rectangular search ranges 13a and 13b, and feature quantity calculation windows 14a and 14b, respectively. In the video frames 11a and 11b, an angle of view of the surveillance camera 1 is fixed.

The video frame 11a in FIG. 2A indicates a video frame at a time point t. The video frame 11b in FIG. 2B indicates a video frame at a time point t+1. The video frame 11b is the next video frame of the video frame 11a. The video frame 11a at the time point t may be referred to as "previous video frame", and the video frame 11b at the time point t+1 may be referred to as "current video frame".

The images 12a and 12b are images of a tracking target. In FIGS. 2A and 2B, an automobile is shown as an example of a tracking target.

The automobiles in the images 12a and 12b are the same automobile. The automobile in the image 12b moves rightward relative to the automobile in the image 12a. That is, the automobile is traveling rightward in the video frames 11a and 11b.

The surveillance camera 1 specifies an automobile, which is a tracking target, in the search range 13a of the previous video frame, and calculates a feature quantity of the image 12a of the specified automobile. The feature quantity is, for example, information indicating features of an image, and includes information such as shape, color, and size of an edge.

The surveillance camera 1 sets the search range 13b in the current video frame and calculates a feature quantity of an image in the search range 13b while moving the feature quantity calculation window 14b in the search range 13b. For example, the surveillance camera 1 moves the feature quantity calculation window 14b in the search range 13b while causing the feature quantity calculation window 14b to scan in a horizontal direction and shifting the horizontal scan in a vertical direction. The surveillance camera 1 calculates the feature quantity of the image at each position in the moved feature quantity calculation window 14.

The surveillance camera 1 determines, as a tracking-target image in the current video frame, an image in the search range 13b of the current video frame, which has a feature quantity that is the most similar to the feature quantity of the tracking-target image in the previous video frame.

For example, the tracking-target image in the previous video frame is the image 12a. The automobile in the image 12b in the current video frame is the same as the automobile in the image 12a, and the feature quantity of the image 12b in the search range 13b is the most similar to the feature quantity of the tracking-target image in the previous video frame. Therefore, the surveillance camera 1 determines the image 12b in the search range 13b of the current video frame as a tracking-target image following the previous video frame.

The current video frame may be a video frame in which an image of a tracking target is searched, may be the latest video frame captured by the surveillance camera 1, or may not be the latest video frame.

Figure 3A:
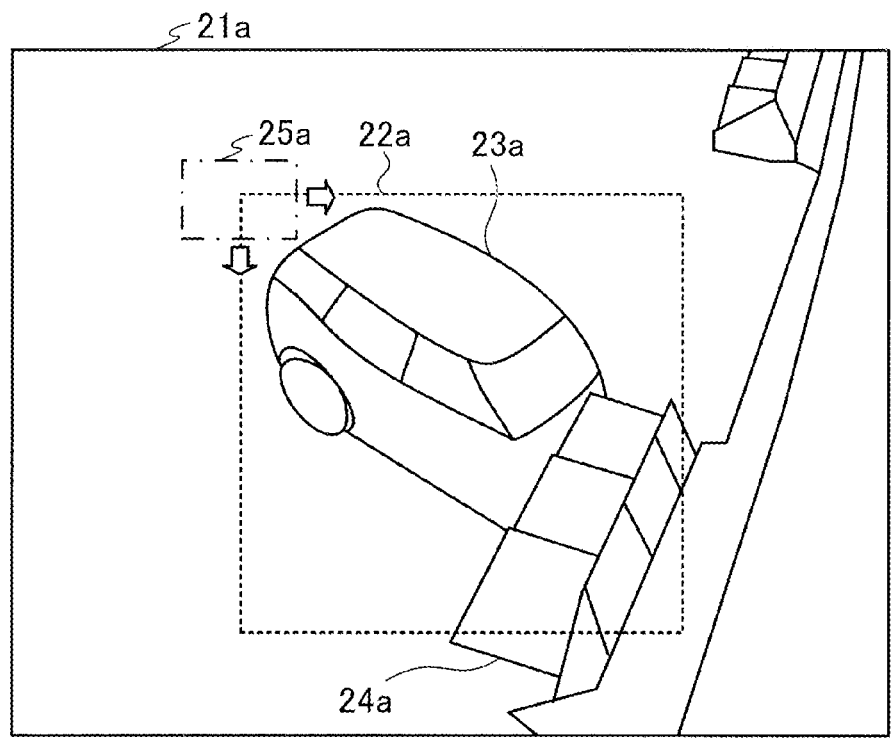
FIG. 3A shows a modification of a tracking-target image.
Figure 3B:
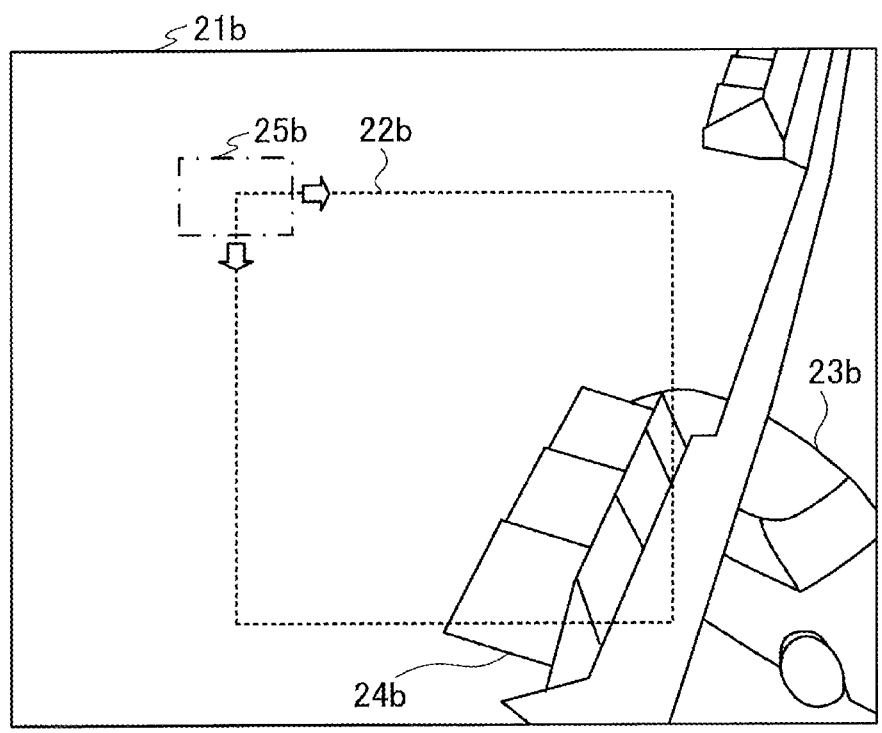
FIG. 3B shows a modification of a tracking-target image.

FIGS. 3A and 3B show modifications of a tracking-target image. FIG. 3A shows a video frame 21a of a surveillance camera. FIG. 3B shows a video frame 21b of the surveillance camera. FIGS. 3A and 3B show rectangular search ranges 22a and 22b, and feature quantity calculation windows 25a and 25b, respectively. In the video frames 21a and 21b, an angle of view of the surveillance camera is fixed.

The video frame 21b in FIG. 3B is a current video frame, and the video frame 21a in FIG. 3A is a previous video frame of the video frame 21b. The video frame 21a displays an automobile 23a and a traffic light 24a. The video frame 21b displays an automobile 23b and a traffic light 24b. The automobile 23a and the automobile 23b are the same automobile, and the traffic light 24a and the traffic light 24b are the same traffic light.

The automobile 23b in the video frame 21b moves downward and rightward relative to the automobile 23a in the video frame 21a. Since the traffic lights 24a and 24b are fixed to a pole fixed to a road, the traffic lights 24a and 24b are displayed at the same position in the video frames 21a and 21b, respectively.

When the traffic light 24a other than a tracking target overlaps the automobile 23a that is a tracking target as shown in the video frame 21a of FIG. 3A, the surveillance camera may change the tracking-target image to an image of the traffic light 24b in the video frame 21b of FIG. 3B.

For example, the search range 22a of the video frame 21a includes the automobile 23a and the traffic light 24a. Therefore, feature quantities of images in the search range 22a also include a feature quantity of the image of the traffic light 24a that is not a tracking target, in addition to a feature quantity of the image of the automobile 23a that is a tracking target. Hereinafter, an object that is not a tracking target may be referred to as a non-tracking target.

The surveillance camera moves the feature quantity calculation window 25b in the video frame 21b, and calculates a feature quantity of an image in the search range 22b. The search range 22b includes the traffic light 24b. When the feature quantity of the image of the traffic light 24b is the most similar to the feature quantity of the image in the search range 22a, the surveillance camera may change the tracking-target image from the image of the automobile 23a to the image of the traffic light 24b.

In this way, for example, when an object other than the tracking target overlaps a tracking target and is displayed, the surveillance camera may erroneously change the tracking target to the object other than the tracking target.

Figure 4A:
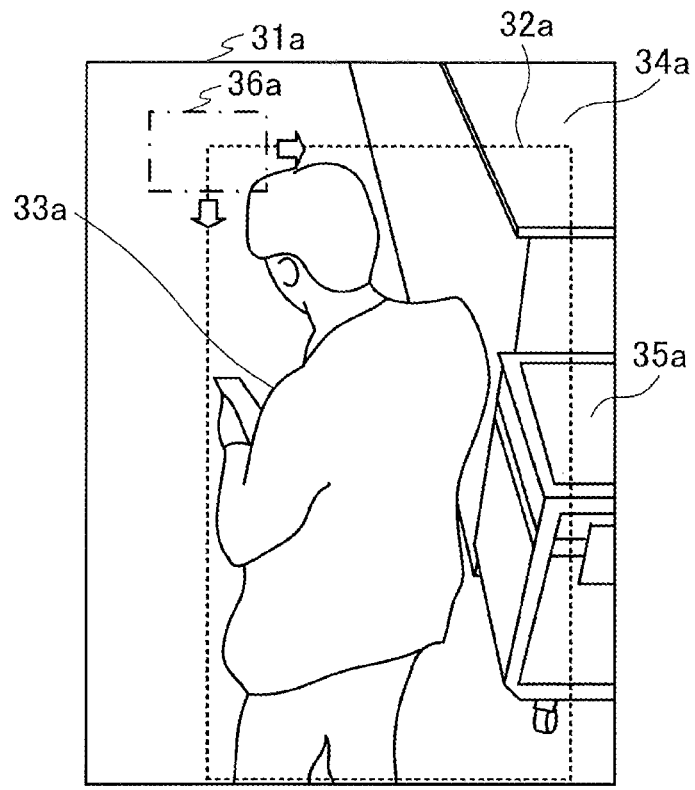
FIG. 4A shows a modification of a tracking-target image.
Figure 4B:
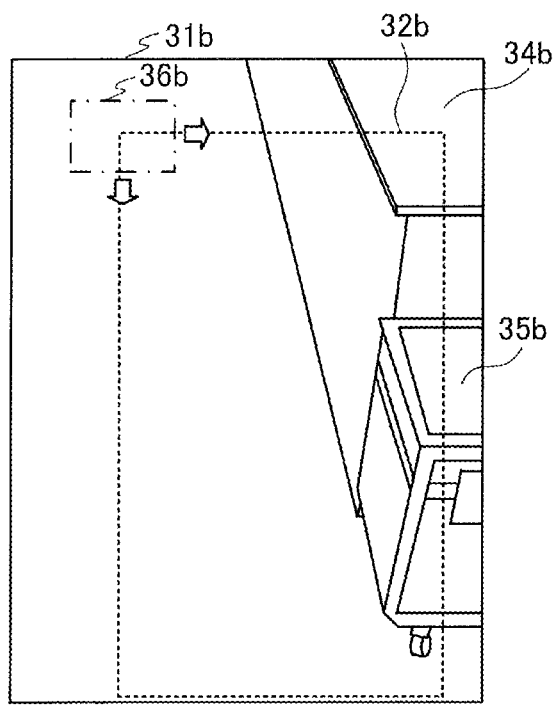
FIG. 4B shows a modification of a tracking-target image.

FIGS. 4A and 4B show modifications of a tracking-target image. FIG. 4A shows a video frame 31a of a surveillance camera. FIG. 4B shows a video frame 31b of the surveillance camera. FIGS. 4A and 4B show rectangular search ranges 32a and 32b, and feature quantity calculation windows 36a and 36b, respectively. In the video frames 31a and 31b, an angle of view of the surveillance camera is fixed.

The video frame 31b in FIG. 4B is a current video frame, and the video frame 31a in FIG. 4A is a previous video frame of the video frame 31b. The video frame 31a displays a person 33a, a table 34a, and a storage box 35a. The video frame 31b displays a table 34b and a storage box 35b.

In the video frame 31b, the person 33a is not displayed. In the video frame 31b, the person 33a moves to the outside of the video frame 31b. The table 34a and the storage box 35a are displayed at the same position in the video frames 31a and 31b. That is, the table 34a and the storage box 35a are not moved in the video frames 31a and 31b.

When the search range 32a includes the table 34a and the storage box 35a in addition to the person 33a who is a tracking target as shown in the video frame 31a of FIG. 4A, the surveillance camera may change the tracking-target image to both or one of the image of the table 34b and the image of the storage box 35b in the video frame 31b.

For example, the search range 32a of the video frame 31a includes the person 33a, the table 34a, and the storage box 35a. Therefore, feature quantities of the images in the search range 32a also include feature quantities of images of the table 34a and the storage box 35a that are a non-tracking target, in addition to a feature quantity of an image of the person 33a that is a tracking target.

The surveillance camera moves the feature quantity calculation window 36b in the video frame 31b and calculates feature quantities of images in the search range 32b. The search range 32b includes the table 34b and the storage box 35b. When feature quantities of images of the table 34b and the storage box 35b are the most similar to the feature quantities of images in the search range 32a, the surveillance camera may change the tracking-target image from the image of the person 33a to the images of the table 34b and the storage box 35b.

In this way, for example, when an object other than the tracking target is displayed in an image of a tracking target, the surveillance camera may erroneously change the tracking target to the object other than the tracking target.

Figure 5A:
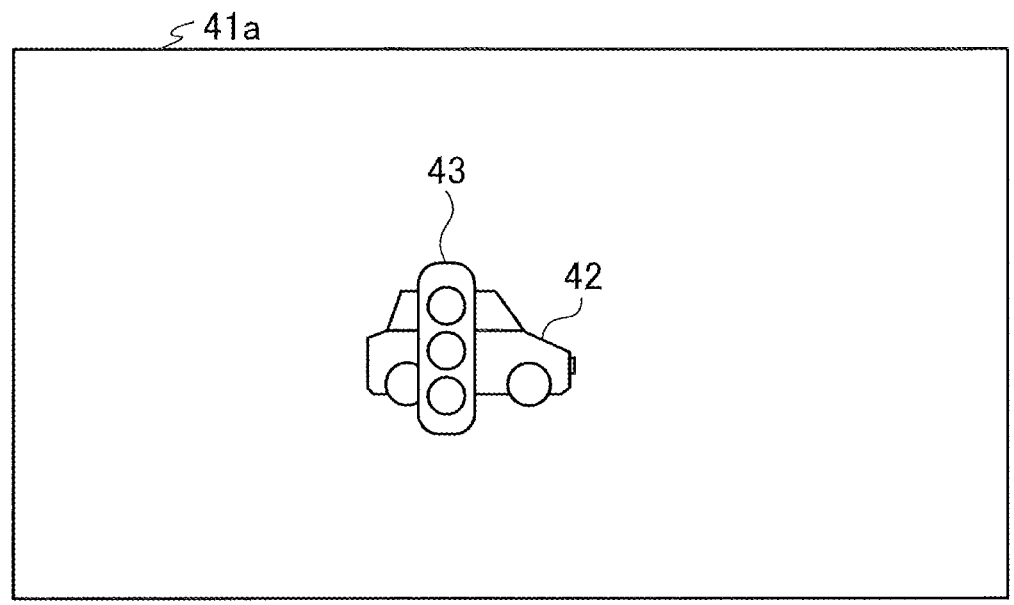
FIG. 5A shows an example of masking processing of a surveillance camera.
Figure 5B:
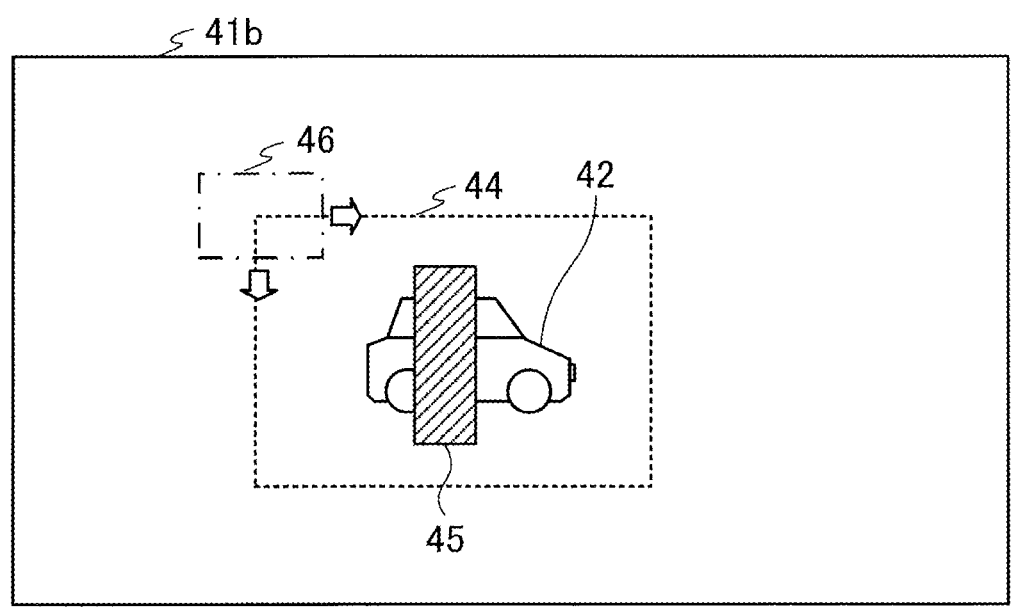
FIG. 5B shows an example of masking processing of the surveillance camera.

FIGS. 5A and 5B show examples of masking processing of the surveillance camera 1. FIG. 5A shows a video frame 41a of the surveillance camera 1. FIG. 5B shows a video frame 41b obtained by masking a part of the video frame 41a in FIG. 5A. The video frames 41a and 41b are video frames at a time point t and are current video frames. FIG. 5B shows a rectangular search range 44 and a feature quantity calculation window 46.

The video frame 41a displays an automobile 42 and a traffic light 43. In FIG. 5A, a position of a general traffic light is ignored to simplify the description.

When extracting the automobile 42 that is a tracking target, the surveillance camera 1 sets the search range 44 in the video frame 41b and causes the feature quantity calculation window 46 to scan in the search range 44 as shown in FIG. 5B. The surveillance camera 1 calculates a feature quantity of an image in the search range 44 where the feature quantity calculation window 46 is caused to scan, and calculates a similarity between the calculated feature quantity and a feature quantity of an image of a tracking target in the previous video frame (an image of the automobile 42 in the previous video frame).

When calculating the similarity between the feature quantities, the surveillance camera 1 masks a feature quantity of the traffic light 43 that is a non-tracking target as indicated by oblique lines 45 in FIG. 5B in a case where the search range 44 includes the traffic light 43 that is a non-tracking target.

For example, when calculating the similarity between the feature quantities, the surveillance camera 1 sets a coefficient (a weighting) of a feature quantity of an image of a masked area to be smaller than a weighting of a feature quantity of an image of a non-masked area. More specifically, in the search range 44 of FIG. 5B, the surveillance camera 1 sets a weighting of a feature quantity of an image other than the area 45 to be 1, and sets a weighting of a feature quantity of an image with the oblique lines 45 to be a value smaller than 1. The surveillance camera 1 calculates the similarity between the feature quantity with the weighting in the search range 44 and the feature quantity of the tracking target in the previous video frame. As a result, the surveillance camera 1 prevents a tracking target from being erroneously changed to a non-tracking target.

The surveillance camera 1 may detect an object that is a non-tracking target by using, for example, artificial intelligence (AI). For example, the surveillance camera 1 may detect the traffic light 43, which is a non-tracking target and is contained in the current video frame, by using the artificial intelligence.

Figure 6:
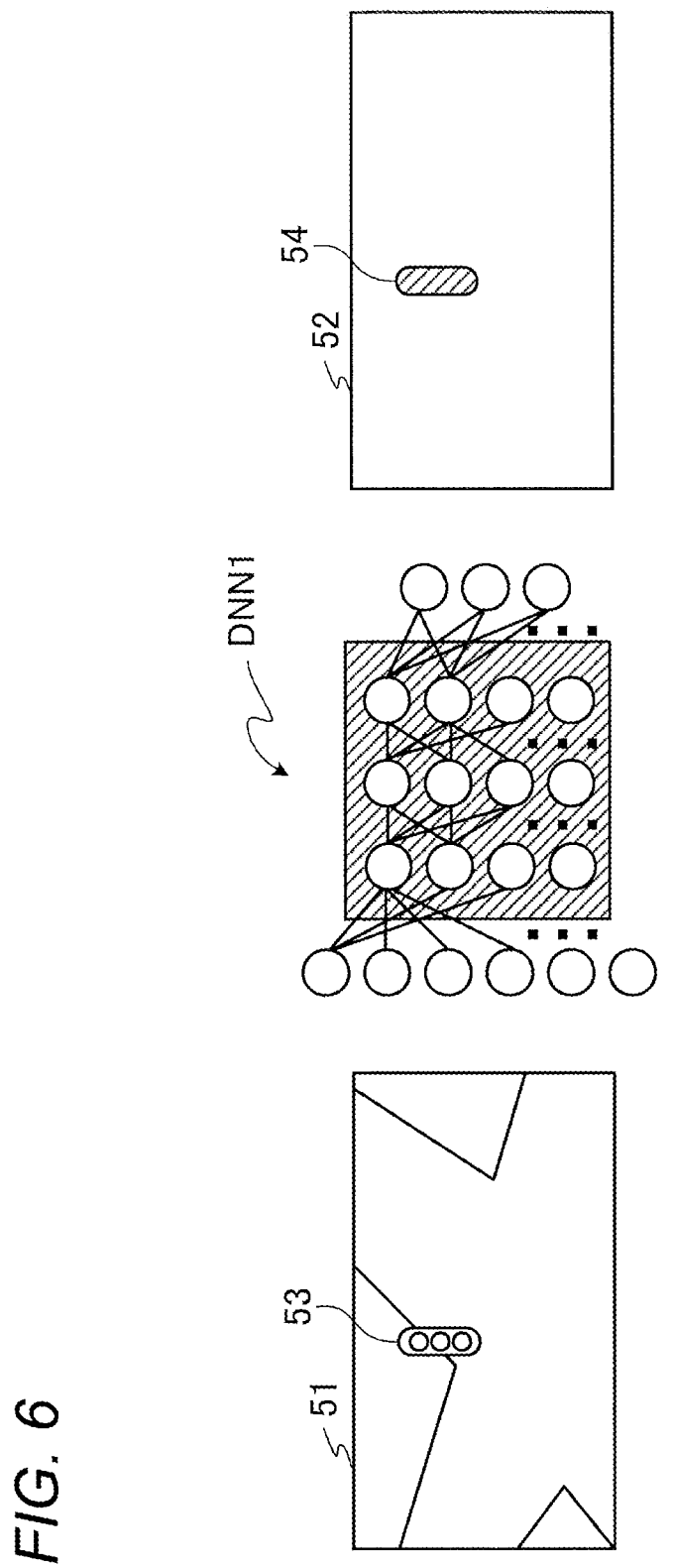
FIG. 6 shows an example of detecting a non-tracking target.

FIG. 6 shows an example of detecting a non-tracking target. FIG. 6 shows a deep neural network DNN 1, a video frame 51, and an output result 52.

The deep neural network DNN 1 is mounted (installed) on the surveillance camera 1. The video frame 51 is a video frame captured by the surveillance camera 1. The video frame 51 is input to an input layer of the deep neural network DNN 1. The output result 52 is output from an output layer of the deep neural network DNN 1.

A structure of the deep neural network DNN 1 is determined by learning in advance, so as to detect an area (a position) of a non-tracking target contained in the video frame 51. In the example of FIG. 6, the structure of the deep neural network DNN 1 is determined by learning in advance, so as to detect an area of the traffic light 53 contained in the video frame 51. The area 54 of the traffic light 53 in the video frame is output from the deep neural network DNN 1 as shown in the output result 52.

When calculating the similarity between the feature quantity of the image of the tracking target in the previous video frame and the feature quantity of the image in the search range of the current video frame, the surveillance camera 1 sets a weighting of the feature quantity in the image of the area 54 to be smaller than a weighting of the feature quantity in another image in a case where the area 54 of the non-tracking target detected by the deep neural network DNN 1 is contained in the search range. In this way, the surveillance camera 1 detects the masking area by the artificial intelligence, changes the weighting of the feature quantity of the image of the detected masking area, and calculates the similarity between the feature quantities.

The structure of the deep neural network DNN 1 may be determined by a device different from the surveillance camera 1. For example, in the information processing apparatus 2, a non-tracking target is learned, and a structure of the deep neural network DNN 1 is determined. The information processing apparatus 2 transmits the determined structure to the surveillance camera 1. The surveillance camera 1 builds the deep neural network DNN 1 based on the structure transmitted from the information processing apparatus 2.

In addition, the deep neural network DNN 1 may detect a plurality of types of non-tracking targets contained in a video frame. For example, the deep neural network DNN 1 may detect at least one or more types of a traffic light, a street tree, a guardrail, and an advertising flag installed on a sidewalk, which are displayed in the video frame.

In FIG. 6, the surveillance camera 1 detects an area of a non-tracking target using the artificial intelligence, and may designate an area of a non-tracking target displayed in a frame according to an instruction from the information processing apparatus 2. For example, in the surveillance camera 1, an area of the traffic light 53 shown in FIG. 6 may be instructed from the information processing apparatus 2. Then, the surveillance camera 1 may mask the designated area.

Figures 7, 8:
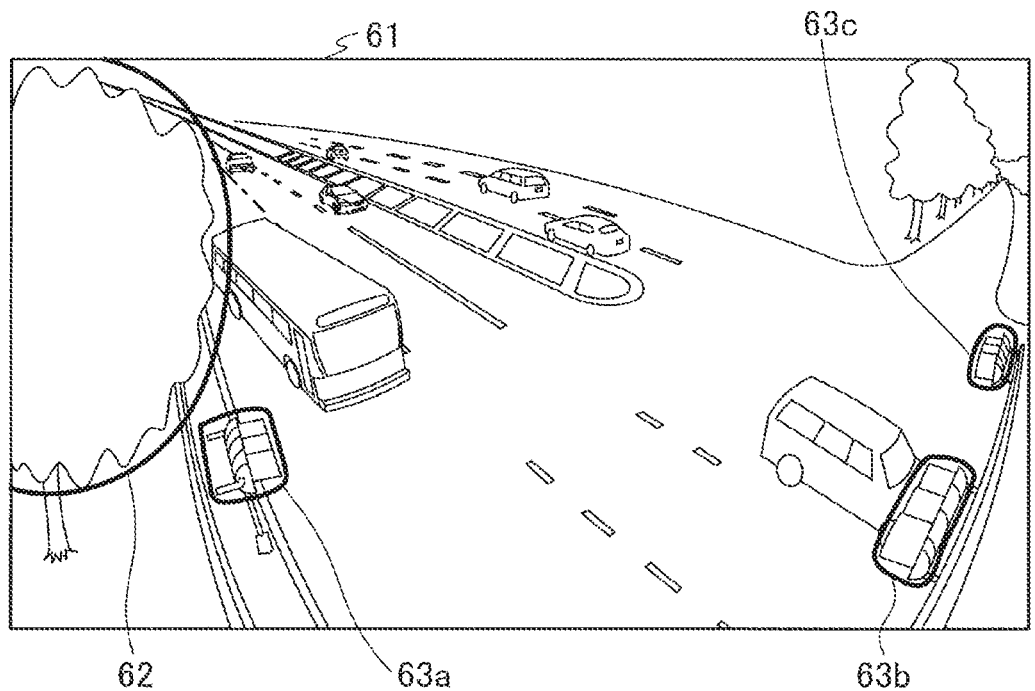
FIG. 7 shows an example of designating an area of a non-tracking target based on an information processing apparatus.
FIG. 8 shows an example of a setting screen displayed on a display device of the information processing apparatus.

FIG. 7 shows an example of designating an area of a non-tracking target by the information processing apparatus 2. FIG. 7 shows a screen 61 displayed on a display device of the information processing apparatus 2. The screen 61 is a screen of a video captured by the surveillance camera 1.

For example, a user operates a mouse of the information processing apparatus 2 to select a non-tracking target to be masked by the surveillance camera 1. For example, the user operates the mouse to surround a street tree as shown by a line 62 in FIG. 7, and selects a non-tracking target to be masked by the surveillance camera 1. In addition, the user operates the mouse to surround traffic lights as shown by lines 63a to 63c in FIG. 7, and selects a non-tracking target to be masked by the surveillance camera 1.

The information processing apparatus 2 transmits information of the non-tracking target selected by the user to the surveillance camera 1. For example, the information processing apparatus 2 transmits information of an area of a non-tracking target, which is selected by the user, in the frame (angle of view) of the surveillance camera 1 to the surveillance camera 1.

The surveillance camera 1 receives the information of the area of the non-tracking target from the information processing apparatus 2. In the search range, the surveillance camera 1 masks a feature quantity of the area of the non-tracking target received from the information processing apparatus 2, and calculates the similarity between feature quantities.

The surveillance camera 1 may switch, according to an instruction from the information processing apparatus 2, between the detection of the area of the non-tracking target by the artificial intelligence shown in FIG. 6 and the selection of the area of the non-tracking target by the information processing apparatus 2 shown in FIG. 7. Hereinafter, it will be described that the surveillance camera 1 switches, depending on the information processing apparatus 2, between the detection of the area of the non-tracking target by the artificial intelligence and the selection of the area of the non-tracking target by the information processing apparatus 2.

FIG. 8 shows an example of a setting screen displayed on the display device of the information processing apparatus 2. A radio button corresponding to "setting" shown in FIG. 8 is a button for selecting whether to use the masking processing for a non-tracking target. In a case where a radio button corresponding to "use" is selected, the surveillance camera 1 performs the masking processing for the non-tracking target. In a case where a radio button corresponding to "not use" is selected, the surveillance camera 1 does not perform the masking processing for the non-tracking target. The surveillance camera 1 executes a common tracking processing.

A radio button corresponding to "automatic change at the time of shift of angle of view" shown in FIG. 8 is a button for selecting whether to change the setting of a masking area of the non-tracking target in a case where the angle of view of the surveillance camera 1 is changed. In a case where a radio button corresponding to "change" is selected, the surveillance camera 1 re-detects an area of the non-tracking target by the artificial intelligence when the angle of view is shifted.

The angle of view of the surveillance camera 1 may be shifted due to a collision with wind, an object or the like. The surveillance camera 1 may detect the shift of the angle of view and re-detect the area of the non-tracking target by the artificial intelligence.

A pull-down menu corresponding to "update area regularly" shown in FIG. 8 is a button for selecting a detection frequency of the non-tracking target by the artificial intelligence. When the pull-down menu is clicked, information for selecting the detection frequency of the non-tracking target by the artificial intelligence is displayed as shown by an arrow AI in FIG. 8.

In a case where time displayed at the pull-down menu is selected, the surveillance camera 1 detects an area of a non-tracking target at an interval of the selected time. For example, the time of one hour is selected in the pull-down menu. A detection target of the non-tracking target is a traffic light. In this case, the surveillance camera 1 detects an area of the traffic light in a frame by the artificial intelligence every other hour.

A "detailed setting" button corresponding to the "manual setting" shown in FIG. 8 is a button for transitioning to a screen for setting a masking area of a non-tracking target. For example, when the "detailed setting" button is clicked by the user, a video screen captured by the surveillance camera 1 is displayed on the display device of the information processing apparatus 2. More specifically, the screen 61 shown in FIG. 7 is displayed on the display device of the information processing apparatus 2. As described with reference to FIG. 7, the user selects the masking area of the non-tracking target on the screen 61.

A radio button corresponding to "masking area change alarm" shown in FIG. 8 is a button for setting whether to issue an alarm to the surveillance camera 1 when the size of the masking area changes in a case where the non-tracking target is regularly detected by the artificial intelligence. For example, in a case where the radio button corresponding to "use" is selected, the surveillance camera 1 outputs an alarm signal when the size of the masking area changes.

More specifically, the masking area becomes larger in a case where a street tree, which is a non-tracking target, grows and becomes larger. In a case where the masking area becomes larger than a threshold, the surveillance camera 1 outputs an alarm signal to the information processing apparatus 2. That is, the surveillance camera 1 outputs an alarm signal to the information processing apparatus 2 in a case where the change amount of the image area of the non-tracking target exceeds a threshold. This allows the user to consider, for example, cutting down the street tree.

Figure 9A:
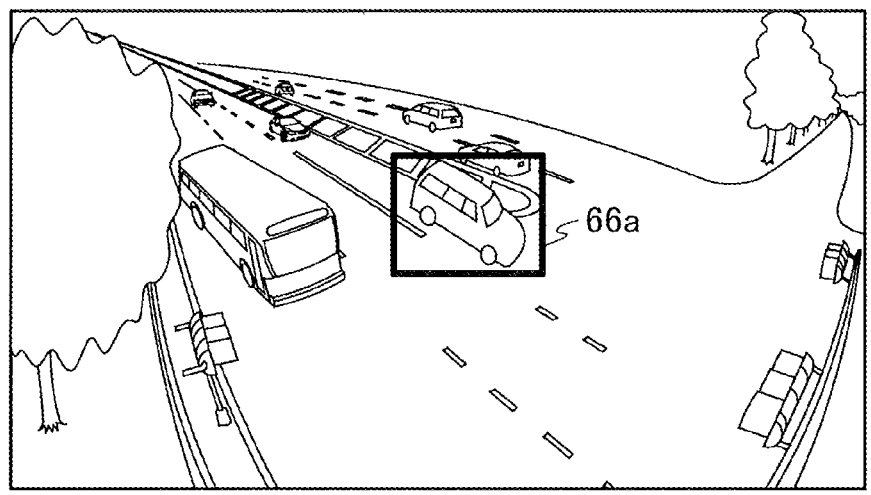
FIG. 9A shows an example of a video screen of the surveillance camera displayed on the display device of the information processing apparatus.
Figure 9B:
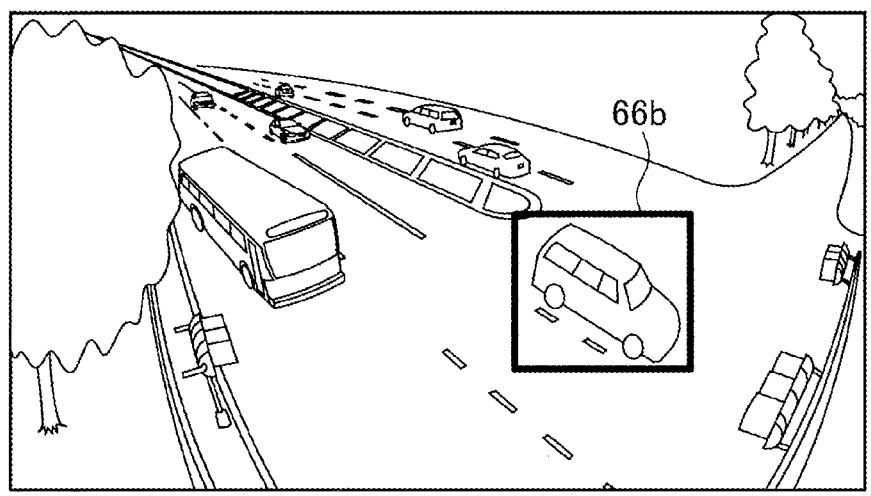
FIG. 9B shows an example of a video screen of the surveillance camera displayed on the display device of the information processing apparatus.
Figure 9C:
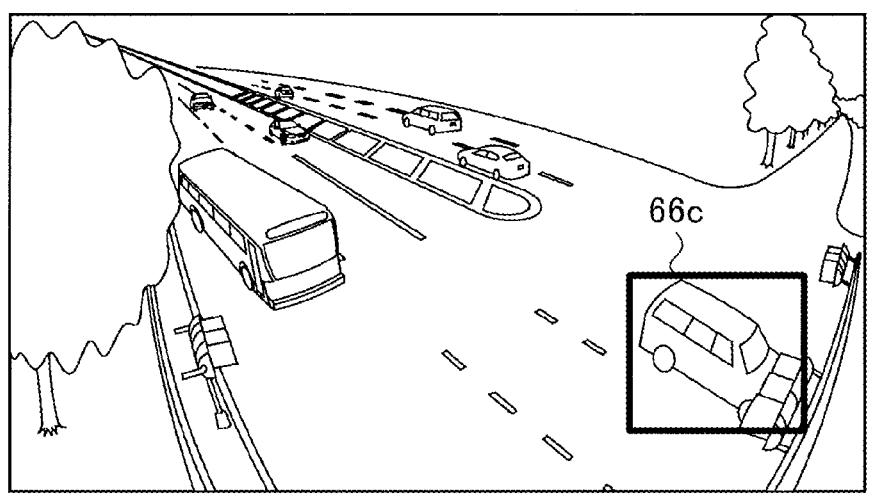
FIG. 9C shows an example of a video screen of the surveillance camera displayed on the display device of the information processing apparatus.

FIGS. 9A to 9C show examples of video screens of the surveillance camera 1 displayed on the display device of the information processing apparatus 2. An example of a screen shown in FIG. 9C is a video of a current video frame. An example of a screen shown in FIG. 9B is a video of a previous video frame. An example of a screen shown in FIG. 9A is a video of a video frame before the previous video frame.

In the examples of screens shown in FIGS. 9A to 9C, markers 66a to 66c indicating a tracking target are displayed. The data of the video frames transmitted to the information processing apparatus 2 by the surveillance camera 1 includes information of the markers 66a to 66c indicating the tracking target. The information processing apparatus 2 displays the markers 66a to 66c, as shown in FIGS. 9A to 9C, based on the information of the markers 66a to 66c transmitted from the surveillance camera 1.

One automobile is tracked and markers 66a to 66c are attached in the examples of FIGS. 9A to 9C, and a plurality of automobiles may be tracked and markers may be attached. In this case, the surveillance camera 1 may change a color of each marker of the plurality of automobiles so that a plurality of automobiles can be identified.

Figure 10A:
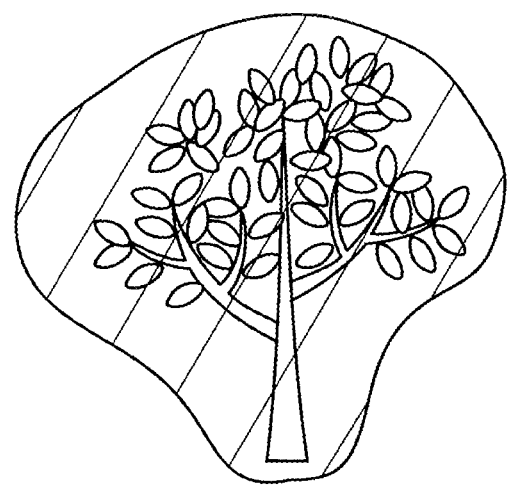
FIG. 10A shows a masking intensity of a non-tracking target.
Figure 10B:
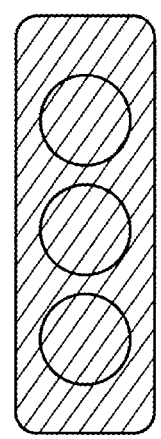
FIG. 10B shows a masking intensity of a non-tracking target.

FIGS. 10A and 10B show a masking intensity of a non-tracking target. FIG. 10A shows a tree as an example of a non-tracking target to be masked. FIG. 10B shows a traffic light as an example of a non-tracking target to be masked.

The surveillance camera 1 may change the masking intensity of a masking area in accordance with the types of non-tracking targets. For example, the surveillance camera 1 sets a masking intensity of an image of a non-tracking target whose shape does not change to be larger than a masking intensity of an image of a non-tracking target whose shape is changed, among non-tracking objects contained in a video frame.

For example, a shape of a tree may be changed by wind. For example, a gap between leaves of a tree may be generated by the wind. Therefore, a tracking target passing from the rear of the tree may be displayed in a video frame from the gaps between the leaves. On the other hand, the shape of the traffic light is not changed generally, and a tracking target passing from the rear of the traffic light is less likely to be displayed on a video frame. Therefore, the surveillance camera 1 sets the masking intensity of the tree to be smaller than that of the traffic light.

More specifically, when calculating the similarity between the feature quantities, the surveillance camera 1 sets a weighting (a coefficient) of a feature quantity in an image of a tree to be a first coefficient that is smaller than 1. On the other hand, when calculating the similarity between the feature quantities, the surveillance camera 1 sets a coefficient of a feature quantity in an image of a traffic light to be smaller than 1 and to be a second coefficient that is smaller than the first coefficient.

The masking intensity is designated by the information processing apparatus 2. For example, the surveillance camera 1 receives a coefficient, corresponding to the type of a non-tracking target, from the information processing apparatus 2. The surveillance camera 1 masks a feature quantity of an image of a non-tracking target and calculates the similarity between the feature quantities by using the received coefficient.

The surveillance camera 1 may set a coefficient of a feature quantity in an image of a non-tracking target, such as a traffic light and a guardrail, from which a tracking target passing from the rear is less likely to be seen, to be 0. In this case, the feature quantity of the image of the non-tracking target is not reflected in the calculation of the similarity between the feature quantities.

In addition, an example of a non-tracking target, from which a tracking target passing from the rear is likely to be seen, includes a flag. When the flag is swung by the wind, the tracking target passing from the rear of the flag may be reflected in a video frame.

A mask based on the first coefficient may be referred to as a soft mask. For example, a mask having a low masking intensity in a tree or a flag may be referred to as a soft mask. A mask based on the second coefficient may be referred to as a hard mask. For example, a mask having a high masking intensity in a traffic light or a guardrail may be referred to as a hard mask.

The setting of the masking intensity is not limited to two types. The types of the masking intensity may be set to three or more.

Figure 11:
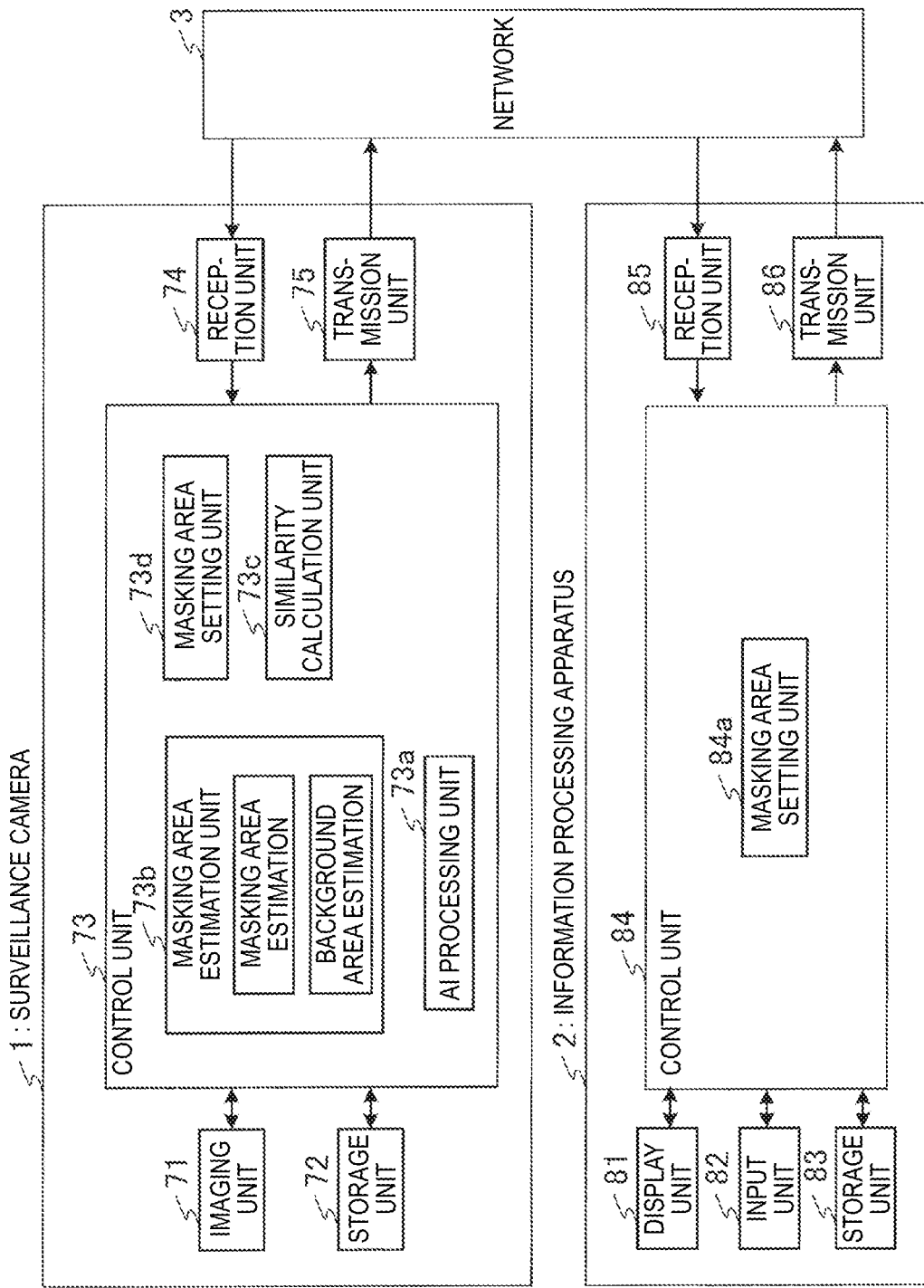
FIG. 11 shows an example of a block configuration of a surveillance camera and an information processing apparatus.

FIG. 11 shows an example of a block configuration of the surveillance camera 1 and the information processing apparatus 2. FIG. 11 also shows the network 3 in addition to the surveillance camera 1 and the information processing apparatus 2. As shown in FIG. 11, the surveillance camera 1 includes an imaging unit 71, a storage unit 72, a control unit 73, a reception unit 74, and a transmission unit 75.

The imaging unit 71 includes, for example, a lens and an imaging element (not shown). The lens of the imaging unit 71 forms an image of a subject on a light receiving surface of the imaging element. The imaging unit 71 converts an electric signal (an analog signal) in accordance with the light received on the light receiving surface of the imaging element into a digital signal, and outputs a video frame of the digital signal to the control unit 73. The imaging unit 71 is movable in the pan-and-tilt directions and changes a focal length in accordance with the control of the control unit 73.

A program for operating the control unit 73 is stored in the storage unit 72. The storage unit 72 stores data for the control unit 73 to perform calculation processing, data for the control unit 73 to control each unit, or the like. The storage unit 72 may be configured with a storage device such as a random access memory (RAM), a read only memory (ROM), a flash memory, and a hard disk drive (HDD).

The control unit 73 controls the entire surveillance camera 1. The control unit 73 may be configured with, for example, a central processing unit (CPU) or a digital signal processor (DSP).

The control unit 73 includes an AI processing unit 73a, a masking area estimation unit 73b, a similarity calculation unit 73c, and a masking area setting unit 73d. The function of each unit of the control unit 73 is implemented by, for example, executing a program, stored in the storage unit 72, by the control unit 73.

The AI processing unit 73a builds, for example, the deep neural network DNN 1. The function of the masking area estimation unit 73b is implemented by the deep neural network DNN 1 built by the AI processing unit 73a.

A video frame captured by the imaging unit 71 is input to the masking area estimation unit 73b. The masking area estimation unit 73b estimates an area (a masking area) of an image of a non-tracking target, such as a traffic light, a street tree, a guardrail, and a flag, and an area (background area) of an image other than the image of the non-tracking target in the input video frame.

The similarity calculation unit 73c sets a search range in a current video frame captured by the imaging unit 71 and calculates a feature quantity of an image in the set search range. In a case where the masking area estimated by the masking area estimation unit 73b is contained in the search range, the similarity calculation unit 73c sets a weighting of a feature quantity in the image of the masking area to be smaller than a weighting of a feature quantity in an image of an unmasked area.

The similarity calculation unit 73c calculates a feature quantity of an image at each position while moving the feature quantity calculation window. The similarity calculation unit 73c determines, as a tracking-target image in the current video frame, an image in the search range of the current video frame, which has a feature quantity that is the most similar to a feature quantity of a tracking-target image in the previous video frame.

The masking area setting unit 73d outputs information of a masking area based on the manual setting, which is received from the information processing apparatus 2, to the similarity calculation unit 73c. In a case where a masking area is designated by the manual setting from the information processing apparatus 2, the similarity calculation unit 73c masks the designated area in a video frame and calculates a feature quantity.

The reception unit 74 receives information transmitted from the information processing apparatus 2 via the network 3. The transmission unit 75 transmits information, which is output from the control unit 73, to the information processing apparatus 2 via the network 3.

The information processing apparatus 2 includes a display unit 81, an input unit 82, a storage unit 83, a control unit 84, a reception unit 85, and a transmission unit 86.

The display unit 81 displays an image on the display device in accordance with the control of the control unit 84.

The input unit 82 receives a signal output from an input device such as a keyboard and a mouse, and outputs the signal to the control unit 84.

A program for operating the control unit 84 is stored in the storage unit 83. The storage unit 83 also stores data for the control unit 84 to perform calculation processing, data for the control unit 84 to control each unit, or the like. The storage unit 83 may be configured with a storage device such as a RAM, a ROM, a flash memory, and a HDD.

The control unit 84 controls the entire information processing apparatus 2. The control unit 84 may be configured with, for example, a CPU.

The control unit 84 includes a masking area setting unit 84a. The function of the masking area setting unit 84a is implemented by, for example, executing a program, stored in the storage unit 83, by the control unit 84.

The masking area setting unit 84a receives selection operation of an image of a non-tracking target via the input unit 82. The masking area setting unit 84a transmits information of an area of an image of the non-tracking target selected by the user to the surveillance camera 1 via the transmission unit 86.

The reception unit 85 receives information transmitted from the surveillance camera 1 via the network 3. The transmission unit 86 transmits information, output from the control unit 84, to the surveillance camera 1 via the network 3.

Figure 12:
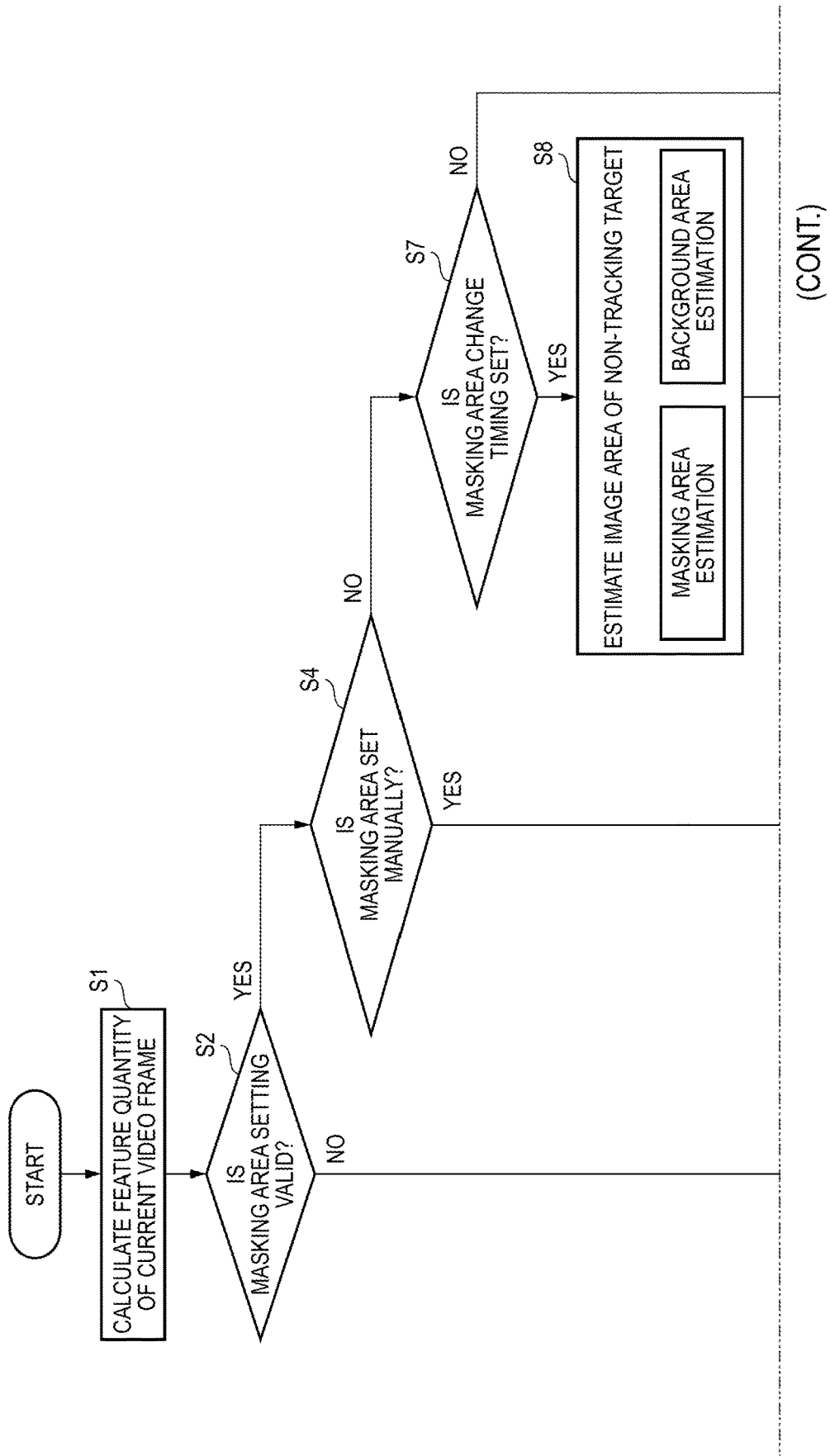
FIG. 12 is a flowchart showing an example of operation of a surveillance camera.

FIG. 12 is a flowchart showing an example of operation of the surveillance camera 1. The control unit 73 of the surveillance camera 1 calculates a feature quantity of a current video frame (S1).

The control unit 73 of the surveillance camera 1 determines whether the masking area setting is valid (S2). For example, in a case where the radio button of "use" corresponding to the "setting" button in FIG. 8 is selected, the control unit 73 of the surveillance camera 1 determines that the masking area setting is valid.

In a case where the control unit 73 of the surveillance camera 1 determines that the masking area setting is not valid ("No" in S2), the control unit 73 of the surveillance camera 1 does not perform masking processing on the current video frame, and calculates similarity between a feature quantity of an image of a tracking target in a previous video frame and a feature quantity of an image in a search range of the current video frame (S3). The control unit 73 of the surveillance camera 1 determines the image in the search range, whose feature quantity is the most similar to that of the image of the tracking target, in the current video frame to be a tracking-target image in the current video frame.

In a case where the control unit 73 of the surveillance camera 1 determines that the masking area setting is valid ("Yes" in S2), the control unit 73 of the surveillance camera 1 determines whether the designation of the masking area is manual setting (S4). For example, in a case where the "detailed setting" button in FIG. 8 is clicked and the non-tracking target is selected by the user, the control unit 73 of the surveillance camera 1 determines that the designation of the masking area is manually set.

In a case where the control unit 73 of the surveillance camera 1 determines that the designation of the masking area is manually set ("Yes" in S4), the control unit 73 of the surveillance camera 1 determines to adopt the manual masking area (selection of a masking area by a user) during the calculation of the feature quantity (S5).

The control unit 73 of the surveillance camera 1 reflects a coefficient (for example, multiplies a coefficient) in a feature quantity of an image in a masking area of the current video frame, and calculates the similarity between the feature quantity of the image of the tracking target in the previous video frame and the feature quantity of the image in the search range of the current video frame (S6).

In a case where the control unit 73 of the surveillance camera 1 determines that the designation of the masking area is not manually set in S4 ("No" in S4), the control unit 73 of the surveillance camera 1 determines whether masking area change timing is set (S7). For example, in a case where any time is selected in the pull-down menu shown by the arrow AI in FIG. 8, the control unit 73 of the surveillance camera 1 determines that the masking area change timing is set.

In a case where the control unit 73 of the surveillance camera 1 determines that the masking area change timing is set ("Yes" in S7), the control unit 73 of the surveillance camera 1 estimates an image area of a non-tracking target by using the artificial intelligence (S8). For example, the control unit 73 of the surveillance camera 1 estimates an area of an image, such as a street tree contained in the current video frame, at a time interval set by the user.

The control unit 73 of the surveillance camera 1 determines whether the image area of the non-tracking target estimated in S8 is larger than the previously estimated image area (S9).

When the control unit 73 of the surveillance camera 1 determines that the image area of the non-tracking target estimated in S8 is larger than the previously estimated image area ("Yes" in S9), an alarm is issued to the information processing apparatus 2 (S10).

The control unit 73 of the surveillance camera 1 determines to adopt an automatic masking area (detection of a masking area by the artificial intelligence) during the calculation of the feature quantity (S11) in a case where the control unit 73 of the surveillance camera 1 determines in S7 that the masking area change timing is not set ("No" in S7), a case where the control unit 73 of the surveillance camera 1 determines in S9 that the image area of the non-tracking target is not larger than the previously estimated image area ("No" in S9), or a case where the alarm is issued in S10. Then, the control unit 73 of the surveillance camera 1 shifts the processing to S6.

FIG. 13 is a flowchart showing an example of detailed operation in S6 of FIG. 12. The control unit 73 of the surveillance camera 1 calculates the similarity for each tracking target (S21).

The control unit 73 of the surveillance camera 1 calculates a feature quantity at each position and calculates the similarity between the images while moving a feature quantity calculation window in the search range set in the current video frame (S22).

The control unit 73 of the surveillance camera 1 determines whether a similarity calculation position of a current feature quantity is a masking area (S23).

In a case where the control unit 73 of the surveillance camera 1 determines that the similarity calculation position of the current feature quantity is not a masking area ("No" in S23), the control unit 73 of the surveillance camera 1 does not perform the masking processing (for example, not multiply a weighting) on the current feature quantity, and calculates the similarity (S24).

On the other hand, in a case where the control unit 73 of the surveillance camera 1 determines that the similarity calculation position of the current feature quantity is a masking area ("Yes" in S23), the control unit 73 of the surveillance camera 1 determines whether the masking area is a soft masking area (S25). For example, the control unit 73 of the surveillance camera 1 determines whether the masking area is a soft masking area in accordance with the type of the object in the masking area, which is captured by the imaging unit 71.

The control unit 73 of the surveillance camera 1 determines that the masking area is not a soft masking area ("No" in S25), the control unit 73 of the surveillance camera 1 does not use the masking area as a target of similarity calculation (S26). For example, in a case where an object in an image in a masking area is a traffic light or a guardrail, the control unit 73 of the surveillance camera 1 determines the masking area as a hard masking area and sets a weighting of a feature quantity of the image in the masking area to be 0.

On the other hand, in a case where the control unit 73 of the surveillance camera 1 determines that the masking area is a soft masking area ("Yes" in S25), the control unit 73 of the surveillance camera 1 uses the masking area as a target of the similarity calculation (S27). For example, in a case where an object in an image in a masking area is a street tree or a flag, the control unit 73 of the surveillance camera 1 determines the masking area as a soft masking area and sets a weighting of a feature quantity of the image in the masking area to be 0.5.

The control unit 73 of the surveillance camera 1 calculates the sum of similarities between feature quantities in the search range (S28). For example, the control unit 73 of the surveillance camera 1 calculates the sum of the similarity, calculated in S24, between the feature quantities outside the masking area, and the similarity, calculated in S27, between the feature quantities in the soft masking area.

In S26, for example, in a case where the weighting of the feature quantity of the image in the hard masking area is set to be larger than 0 and smaller than the weighting in the soft masking area, the control unit 73 of the surveillance camera 1 also sums the similarities between the feature quantities in the hard masking area.

After calculating the sum of the similarities between the feature quantities in S28, the control unit 73 of the surveillance camera 1 determines a tracking target based on the calculated total value (S29). For example, the control unit 73 of the surveillance camera 1 determines, as an image of the tracking target, an image in a search range having the highest similarity among the similarities in search ranges.

As described above, the surveillance camera 1 includes the imaging unit 71 that outputs a video frame, and the control unit 73 that sets a search range for searching for a tracking-target image in the video frame and extracts the tracking-target image by using a feature quantity of the image in the search range. In a case where an image of an object other than the tracking target is contained in the search range, the control unit 73 masks a feature quantity of the image of the object and extracts the tracking-target image. As a result, the surveillance camera 1 can prevent the tracking target being changed to a non-tracking target and can appropriately track the tracking target.

(Modifications)

In the above description, the surveillance camera 1 is equipped with the artificial intelligence and automatically detects a masking area, but the present invention is not limited thereto. The information processing apparatus 2 may be equipped with the artificial intelligence and may automatically detect a masking area. That is, the information processing apparatus 2 may execute masking processing, tracking processing, and the like based on the video received from the surveillance camera 1.

Figure 14:
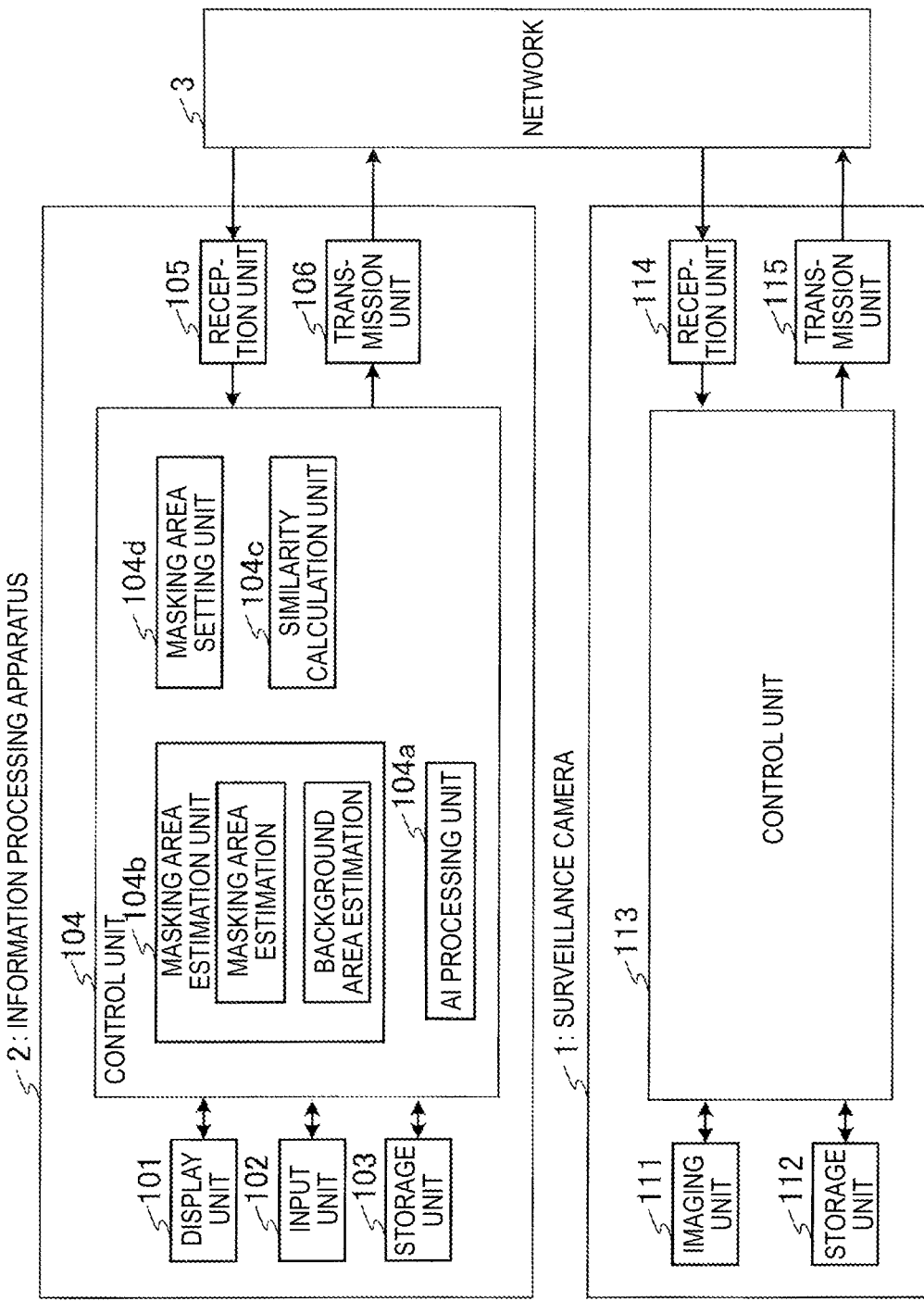
FIG. 14 shows an example of a block configuration of a surveillance camera and an information processing apparatus.

FIG. 14 shows an example of a block configuration of the surveillance camera 1 and the information processing apparatus 2. FIG. 14 also shows the network 3 in addition to the surveillance camera 1 and the information processing apparatus 2. As shown in FIG. 14, the information processing apparatus 2 includes a display unit 101, an input unit 102, a storage unit 103, a control unit 104, a reception unit 105, and a transmission unit 106.

The display unit 101, the input unit 102, and the storage unit 103 have the same functions as those of the display unit 81, the input unit 82, and the storage unit 83 described with reference to FIG. 11, and descriptions thereof are omitted.

The control unit 104 has the same function as that of the control unit 73 described with reference to FIG. 11. However, the control unit 104 is different from the control unit 73 in that video data, which is received from the surveillance camera 1 by the reception unit 105, is input to the control unit 104, and an image of the tracking target is tracked. A masking area setting unit 104d has the same function as that of the masking area setting unit 84a described with reference to FIG. 11.

The reception unit 105 and the transmission unit 106 have the same functions as those of the reception unit 85 and the transmission unit 86 described with reference to FIG. 11 respectively, and descriptions thereof are omitted.

The surveillance camera 1 includes an imaging unit 111, a storage unit 112, a control unit 113, a reception unit 114, and a transmission unit 115. The imaging unit 111, the storage unit 112, the control unit 113, the reception unit 114, and the transmission unit 115 have the same functions as those of the imaging unit 71, the storage unit 72, the control unit 73, the reception unit 74, and the transmission unit 75 described with reference to FIG. 11 respectively, and descriptions thereof are omitted. However, the control unit 113 is different from the control unit 73 in that the control unit 113 does not have the functions of the AI processing unit 73a, the masking area estimation unit 73b, the similarity calculation unit 73c, and the masking area setting unit 73d of the control unit 73.

As described above, the information processing apparatus 2 includes the reception unit 105 that receives a video frame from the surveillance camera 1, and the control unit 104 that sets a search range for searching for a tracking-target image in the video frame and extracts the tracking-target image by using a feature quantity of the image in the search range. In a case where an image of an object other than the tracking target is contained in the search range, the control unit 104 masks a feature quantity of the image of the object and extracts the tracking-target image. As a result, the information processing apparatus 2 can prevent the tracking target being changed to a non-tracking target and can appropriately track the tracking target.

In the above embodiments, the expression "--- portion" used for each component may be substituted with other expressions such as "--- circuitry", "--- device", "--- unit", and "---module".

Although the embodiment has been described above with reference to the drawings, the present disclosure is not limited to such examples. It will be apparent to those skilled in the art that various changes and modifications can be conceived within the scope of the claims. It should be understood that such changes and modifications also belong to the technical scope of the present disclosure. Moreover, constituent elements in the embodiments may be combined in any way within a range not departing from the gist of the present disclosure.

The present disclosure may be implemented by software, hardware, or software linked with hardware. Each functional block used in the description of the above embodiments may be partially or entirely implemented as an LSI which is an integrated circuitry, and each process described in the above embodiments may be partially or entirely controlled by a single LSI or a combination of LSIs. The LSI may be configured with individual chips, or may be configured with one chip so as to include a part or all of the functional blocks. The LSI may include data input and output. The LSI may be referred to as an IC, a system LSI, a super LSI, or an ultra LSI depending on difference in a degree of integration.

The method of circuitry integration is not limited to the LSI, and the circuitry integration may also be implemented by a dedicated circuitry, a general-purpose processor, or a dedicated processor. A FPGA which can be programmed after manufacturing of the LSI or a reconfigurable processor which can reconfigure the connection and settings of circuitry cells inside the LSI may be used. The present disclosure may be implemented as digital processing or analog processing.

Further, if a circuitry integration technology that replaces the LSI emerges due to a progress of a semiconductor technology or another derivative technology emerges, the technology may naturally be used to integrate the functional blocks. Application of biotechnology or the like may also be possible.

INDUSTRIAL APPLICABILITY

The present disclosure is useful in a surveillance camera that tracks images of a tracking target.

What is claimed is:

1. A surveillance camera comprising:
a camera configured to output a video frame; and
a processor configured to:
set a search range in the video frame,
determine feature quantities of an image in the search range,
perform similarity calculations between the feature quantities of the image in the search range and feature quantities of a tracking-target image in a previous video frame, and
extract a tracking-target image in the video frame by using the similarity calculations,
wherein, in a case where a non-tracking target image is included in the search range, the processor masks feature quantities of the non-tracking target image, and extracts the tracking-target image in the video frame with the feature quantities of the non-tracking target image masked,
wherein the processor is configured to:
utilize a first masking intensity to mask the feature quantities of the non-tracking target image, in a case where a shape of an object in the non-tracking target image does not change, and
utilize a second masking intensity, which is larger than the first masking intensity, to mask the feature quantities of the non-tracking target image, in a case where the shape of the object changes.

2. The surveillance camera according to claim 1, wherein the processor detects the non-tracking target image by using artificial intelligence.

3. The surveillance camera according to claim 1, wherein an area of the non-tracking target image is designated by an information processing apparatus.

4. The surveillance camera according to claim 1, wherein the processor detects an area of the non-tracking target image in the video frame in a case where an angle of view of the camera is changed.

5. The surveillance camera according to claim 4, wherein the processor outputs an alarm signal in a case where a change amount of the area of the non-tracking target image exceeds a threshold.

6. The surveillance camera according to claim 2, wherein the processor regularly detects the non-tracking target image.

7. An information processing apparatus comprising:
a receiver configured to receive a video frame from a surveillance camera; and
a processor configured to:
set a search range in the video frame,
determine feature quantities of an image in the search range,
perform similarity calculations between the feature quantities of the image in the search range and feature quantities of a tracking-target image in a previous video frame, and
extract a tracking-target image in the video frame by using the similarity calculations,
wherein, in a case where an non-tracking target image is included contained in the search range, the processor masks feature quantities of the non-tracking target image, and extracts the tracking-target image in the video frame with the feature quantities of the non-tracking target image masked,
wherein the processor is configured to:
utilize a first masking intensity to mask the feature quantities of the non-tracking target image, in a case where a shape of an object in the non-tracking target image does not change, and
utilize a second masking intensity, which is larger than the first masking intensity, to mask the feature quantities of the non-tracking target image, in a case where the shape of the object changes.

8. A method for an information processing apparatus, the method comprising:

receiving a video frame from a surveillance camera;
setting a search range in the video frame;
determining feature quantities of an image in the search range,
performing similarity calculations between the feature quantities of the image in the search range and feature quantities of a tracking-target image in a previous video frame, and
extracting a tracking-target image in the video frame by using the similarity calculations,
wherein, in a case where a non-tracking target image is included in the search range, feature quantities of the non-tracking target image are masked, and the tracking-target image in the video frame is extracted with the feature quantities of the non-tracking target image masked,
wherein a first masking intensity is utilized to mask the feature quantities of the non-tracking target image, in a case where a shape of an object in the non-tracking target image does not change,
wherein a second masking intensity, which is larger than the first masking intensity, is utilized to mask the feature quantities of the non-tracking target image, in a case where the shape of the object changes.

9. The surveillance camera according to claim 1, wherein the processor masks feature quantities of the non-tracking target image by applying weights to the feature quantities of the non-tracking target image.

* * * * *